United States Patent
Ogura et al.

(10) Patent No.: US 8,739,591 B2
(45) Date of Patent: Jun. 3, 2014

(54) ELECTRODE TIP DRESSING APPARATUS AND TOOL USED THEREFOR

(75) Inventors: Shuhei Ogura, Nishin (JP); Kouji Nomura, Toyota (JP); Mikiji Suzuki, Okazaki (JP); Yuki Doi, Toyota (JP); Takayuki Shimizu, Nishin (JP); Shinji Terada, Aichi (JP); Kiyoshi Shinki, Toyota (JP); Hideya Kimura, Toyota (JP); Yoshinori Tanaka, Okazaki (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 1375 days.

(21) Appl. No.: 11/885,376

(22) PCT Filed: Feb. 28, 2006

(86) PCT No.: PCT/JP2006/304188
§ 371 (c)(1),
(2), (4) Date: Aug. 30, 2007

(87) PCT Pub. No.: WO2006/093303
PCT Pub. Date: Sep. 8, 2006

(65) Prior Publication Data
US 2008/0134743 A1    Jun. 12, 2008

(30) Foreign Application Priority Data
Mar. 1, 2005    (JP) .................................. 2005-056174

(51) Int. Cl.
*B21D 31/00*    (2006.01)
(52) U.S. Cl.
USPC ................................................ 72/112; 72/67
(58) Field of Classification Search
USPC ........................ 72/67, 112, 126; 409/138, 140
See application file for complete search history.

(56) References Cited

U.S. PATENT DOCUMENTS

| 4,762,446 A | 8/1988 | Nishiwaki |
| 4,892,448 A * | 1/1990 | Hoch et al. .................... 409/181 |
| 6,499,921 B1 | 12/2002 | Frasher |

FOREIGN PATENT DOCUMENTS

| JP | 61-103682 | 5/1986 |
| JP | 11-077331 | 3/1999 |

(Continued)

OTHER PUBLICATIONS

Tezawa, Kazuhiro, English computer translation of JP 11-077331, Electrode Grinding Cutter of Spot Welding, Mar. 23, 1999, pp. 1-7.*

(Continued)

*Primary Examiner* — Teresa M Ekiert
(74) *Attorney, Agent, or Firm* — Finnegan, Henderson, Farabow, Garrett & Dunner, LLP (57) ABSTRACT

There are provided an electrode tip dressing apparatus and an electrode tip dressing tool for resistance welding, which are miniaturized by reducing a rotational driving-force of a dressing tool. By adjusting a curvature radius of a dressing portion 4 of a dressing tool 2, a contact width, wherein a top electrode tip 5 abuts to the dressing portion 4 of the dressing tool 2, is adjusted from a rotational center of the dressing tool 2 to the outer side of the dressing tool 2. Dressing work done with the dressing tool 2 is thus made to be constant at the whole area of the dressing portion 4, from the rotational center of the dressing tool 2 to the outer side of the dressing tool 2. Accordingly, excess dressing work, which brings decline of productivity, can be avoided, thus enabling to dress the top electrode tip 5 with the minimal dressing work. A rotational driving-power of the dressing tool 2 is thereby reduced, enabling to labor-save and miniaturize the electrode tip dressing apparatus.

4 Claims, 5 Drawing Sheets

(56) References Cited

FOREIGN PATENT DOCUMENTS

| | | |
|---|---|---|
| JP | 2005-000945 | 1/2005 |
| JP | 2005-14019 | 1/2005 |

OTHER PUBLICATIONS

Extended European Search Report for EP 06715247, dated Dec. 4, 2009.

* cited by examiner

PRIOR ART

FIG. 10A

PRIOR ART

FIG. 10B (R3=R4)

PRIOR ART

ELECTRODE TIP DRESSING APPARATUS AND TOOL USED THEREFOR

TECHNICAL FIELD

The present invention relates to an electrode tip dressing apparatus and an electrode tip dressing tool, which are used for spot welding (resistance welding).

BACKGROUND ART

In a spot welding machine, the top of an electrode tip (hereinafter top electrode tip), when electrified, is exposed to a high temperature under a high pressure. The top electrode tip of the spot welding machine is thus deformed each time the spot welding machine is electrified, which gradually increases the diameter of a flat portion of the top electrode tip. In the spot welding (resistance welding), on condition that status such as a welding current, etc. is fixed, if the diameter of the flat portion of the top electrode tip is increased, current density of the welding current applied to a jointed portion of work is decreased, which makes difficult to form a well-conditioned nugget. Accordingly, the strength of the jointed portion of the work is deteriorated, which eventually lowers product reliability. Therefore, in the spot welding (resistance welding) machine, each time the top electrode tip is electrified, an amount of the welding current is gradually increased, keeping constant the current density of the welding current applied to the jointed portion of the work. This kind of the spot welding machine provided with a step-up function has been generally used. With the spot welding machine, the well-conditioned nugget is continuously obtainable.

However, in the spot welding (resistance welding), a surface treatment such as galvanization, etc. is often applied to the work. In case the spot welding is continuously applied to the work under the surface treatment, a surface treatment material such as zinc melted may adhere to the top electrode tip due to an exoergic heat during the electrification. This may cause adhesion between the work and the top electrode tip. Thus, the top electrode tip is dressed periodically, for example, in every 50 welding, so that the adhesion between the work and the top electrode tip is prevented. In general, in a welding robot provided with a spot welding gun, each time a given number of welding is completed, the welding gun is made to set at an electrode tip dressing position, so that the top electrode tip is dressed by means of an electrode tip dressing apparatus. This type of the dressing is conducted by: driving rotatively a dressing tool of the electrode tip dressing apparatus (see, for example, Patent Document 1) with an electric motor; pressing a pair of the top electrode tip to the dressing tool; and cutting the top electrode tip with the dressing tool.

Figure 9:
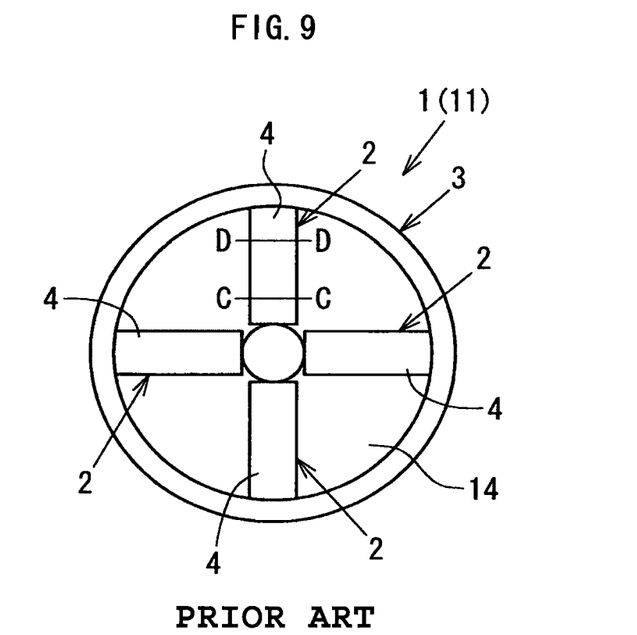
FIG. 9 is an explanatory view of a conventional electrode tip dressing apparatus, which shows dressing tools arranged in a dressing head.

Now, in the electrode tip dressing apparatus, for cutting and finishing the top electrode tip in a good manner, the top electrode tip needs to be cut for at least 0.2 mm. Further, in order to ensure a certain welding quality in a spot welding (resistance welding), it is recommendable to dress (cut) the top electrode tip in every single work. Accordingly, to obtain the welding quality, if 40 works are conducted, or the top electrode tip is cut for 8 mm, the electrode tip needs to be exchanged. This not only notably lowers productivity but also increases cost. Thus, as shown in FIG. 9, there has been an electrode tip dressing apparatus 1 wherein dressing tools 2 are exchanged from a cutting type to a plastic-deformation type. In this electrode tip dressing apparatus 1, while contacting top of an electrode tip (hereinafter top electrode tip) to the dressing tools 2, the dressing tools 2 are rotated around the electrode tip, whereby the top electrode tip is plastically deformed and dressed to a given form.

However, in this type of the electrode tip dressing apparatus 1, even if a contact pressure between the top electrode tip and a dressing portion 4 of each of the dressing tools 2 is made uniform, there occurs a different circumferential speed between a rotational center of the dressing tools 2 and an outer side thereof. Since a relative traveling speed to the top electrode tip is different between the rotational center of the dressing tools 2 and the outer side thereof, the dressing done with the dressing tools 2 is not constant. In the conventional electrode tip dressing tool, the outer rotational side of the dressing tools 2 is subject to an excess amount of work, thus increasing a rotational driving-force of the dressing tools 2. Therefore, a larger electric motor to drive the dressing tools 2 is required, thereby making the electrode tip dressing apparatus 1 eventually larger.

Patent Document 1: Japanese Patent Application Laid-open No. H11-77331

DISCLOSURE OF INVENTION

Problem to be Solved by Invention

The present invention has been made in the light of the above problem, and a first object of the present invention is to provide an electrode tip dressing apparatus, which is miniaturized by reducing a rotational driving-force of a dressing tool. Further, a second object of the present invention is to provide an electrode tip dressing tool for the electrode tip dressing apparatus.

Means for Solving Problems

In order to achieve the object described above, consistent with disclosed embodiments, there is provided an electrode tip dressing apparatus, in which top of an electrode tip is pressed against pluralities of dressing tools radially arranged; the dressing tools are rotated around the electrode tip so as to conduct a relative displacement between the top of the electrode tip and a dressing portion of each of the dressing tools; and the top of the electrode tip is plastically deformed into a given form, wherein the dressing portion is constructed so that an amount of dressing work, in which the dressing tools conduct to the top of the electrode tip, becomes constant from the rotational center of the dressing tools to the outer side of the dressing tools.

Consistent with disclosed embodiments, the electrode tip dressing apparatus includes a feature of that each of the dressing tools with the dressing portion in an identical form is evenly arranged around the rotational center of the dressing tools; and a contact width in which the top of the electrode tip abuts to the dressing portion is adjusted so that an amount of dressing work, in which the dressing tools conduct to the top of the electrode tip, becomes constant at the whole area of the dressing portion, from the rotational center of the dressing tools to the outer side of the dressing tools.

Consistent with disclosed embodiments, the electrode tip dressing apparatus includes: main dressing tools by which the top of the electrode tip is dressed from the center of the electrode tip to the outer side of the electrode tip; and adjusted dressing tools arranged so as to offset an amount of deviated dressing work done with the main dressing tools.

In order to achieve the object described above, consistent with disclosed embodiments, there is provided an electrode tip dressing tool, in which dressing tools are radially arranged in an electrode tip dressing apparatus, and are rotated around an electrode tip while the top of the electrode tip is pressed against a dressing portion of each of the dressing tools; and the top of the electrode tip and the dressing portion are relatively displaced so that the top of the electrode tip is plastically deformed into a given form, wherein a contact width, in which the top of the electrode tip abuts to the dressing portion, is adjusted so that an amount of dressing work conducted to the top of the electrode tip becomes constant at the whole area of the dressing portion, from the rotational center of the dressing tools to the outer side of the dressing tools.

Accordingly, consistent with disclosed embodiments, an excess amount of dressing work in dressing is decreased, so that a rotational driving power of dressing tools can be reduced.

Consistent with disclosed embodiments, an amount of dressing work done with dressing tools can be constant on the whole area of dressing portions, so that an excess amount of dressing work in dressing is decreased, resulting in reduction of a rotational driving power of the dressing tools.

Consistent with disclosed embodiments, by optionally setting shape and arrangement of adjusted dressing tools (length and contact width), an amount of dressing work done with dressing tools can be constant on the whole area of dressing portions, so that an excess amount of dressing work in dressing is decreased, resulting in reduction of a rotational driving power of the dressing tools.

Consistent with disclosed embodiments, an amount of dressing work done with dressing tools can be constant on the whole area of dressing portions, so that an excess amount of dressing work in dressing is decreased, resulting in reduction of a rotational driving power of the dressing tools.

Effect of Invention

The present invention can provide an electrode tip dressing apparatus and an electrode tip dressing tool, both successfully miniaturized by reducing the rotational driving-force of the dressing tool.

BRIEF DESCRIPTION OF DRAWINGS

FIG. 4 is an explanatory view of the electrode tip dressing apparatus according to an embodiment of the present invention, wherein

FIG. 7 is an explanatory view of the electrode tip dressing apparatus according to another embodiment of the present invention, wherein

FIG. 10 is an explanatory view of a conventional electrode tip dressing apparatus, wherein

EXPLANATION OF REFERENCES

1. Electrode tip dressing apparatus
2. Dressing tool
4. Dressing portion
5. Top of Electrode tip
6. Electrode tip

BEST MODE FOR CARRYING OUT THE INVENTION

Figure 1:
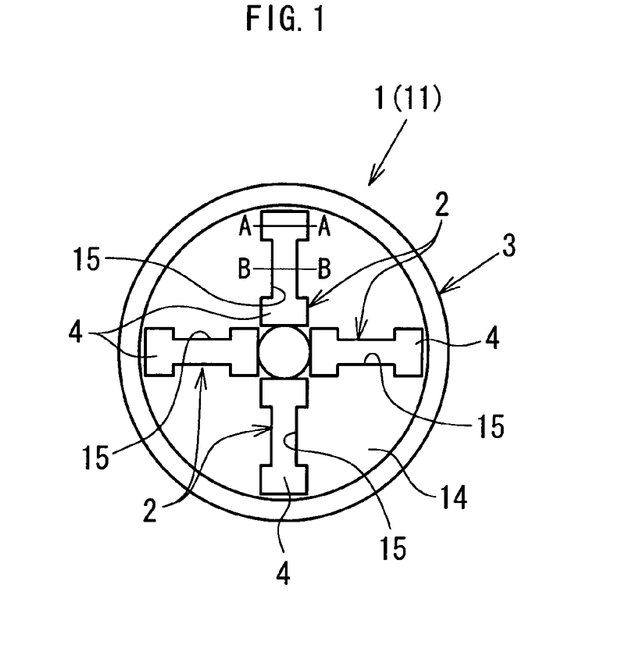
FIG. 1 is an explanatory view of an electrode tip dressing apparatus according to an embodiment of the present invention, which shows dressing tools arranged in a dressing head.
Figure 2:
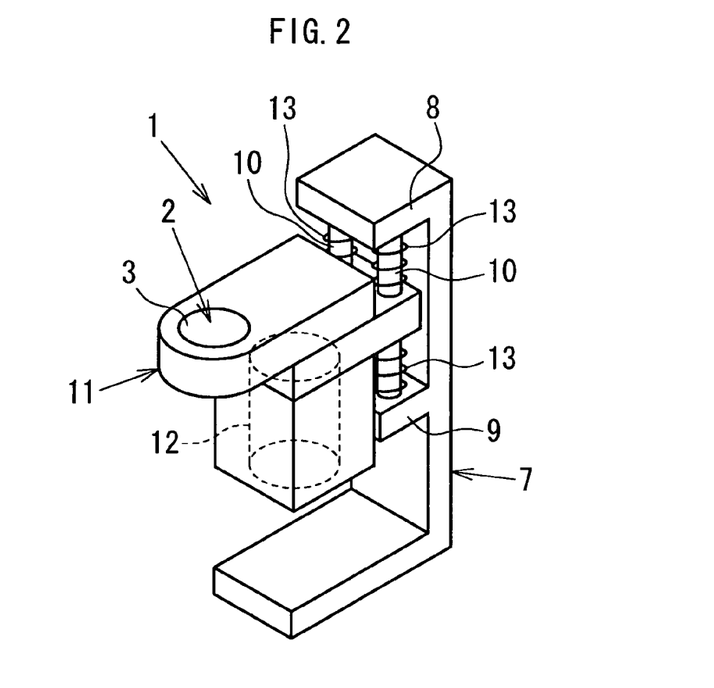
FIG. 2 is a perspective view of the electrode tip dressing apparatus according to an embodiment of the present invention.

A first preferred embodiment of the present invention will be described with reference to FIGS. 1 to 5. As shown in FIG. 1, an electrode tip dressing apparatus 1 is provided with a dressing tool holder 3 wherein pluralities of dressing tools 2 (4 tools in this embodiment) are arranged in a radial direction. In condition that a top portion of electrode tip 5 (hereinafter top electrode tip 5) of an electrode tip 6 is made to abut to a dressing portion 4 of each of the dressing tools 2, the dressing tool holder 3 is driven to rotate around the electrode tip 6. The top electrode tip 5 is thus moved relative to the dressing portion 4 of each of the dressing tools 2, whereby the top electrode tip 5 is plastically deformed so as to be dressed into a given form. Further, as shown in FIG. 2, the electrode tip dressing apparatus 1 is provided with a frame 7 formed approximately into E-shape, and a pair of guide rails 10 is provided between a top plate 8 and a bottom plate 9 of the frame 7 in such a manner that each of the guide rails 10 is arranged parallel to each other. Accordingly, in the electrode tip dressing apparatus 1, a dressing head 11 is guidable in a downward direction (in FIG. 2) by means of the pair of the guide rails 10; at the tip portion of the dressing head 11, the dressing tool holder 3 is rotatively provided.

Figure 3:
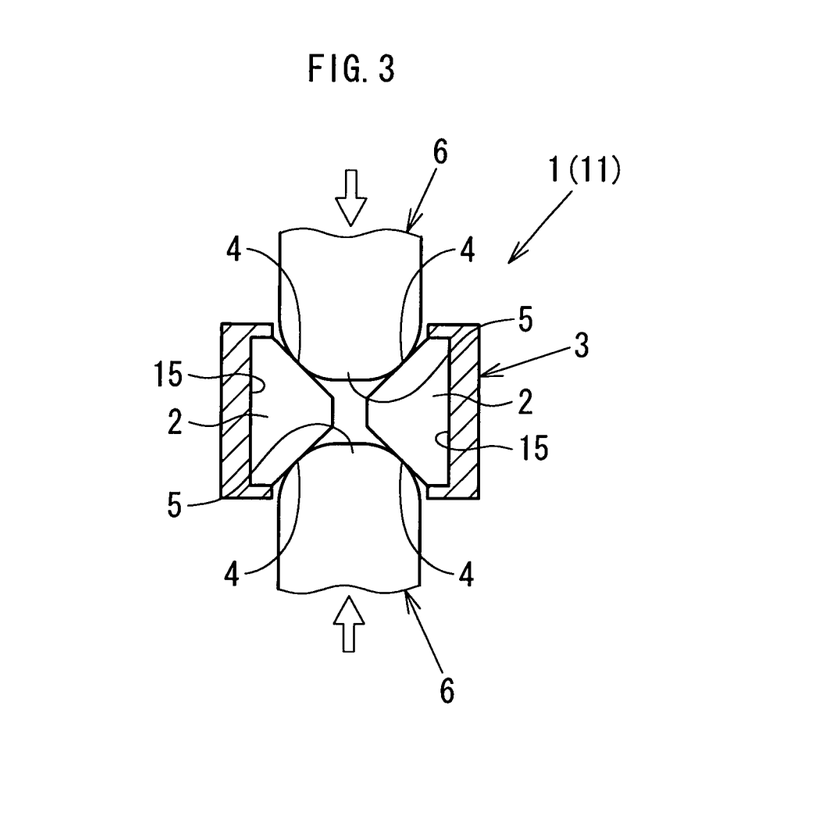
FIG. 3 is an explanatory view of the electrode tip dressing apparatus according to an embodiment of the present invention, which shows a condition of dressing.

Furthermore, in the electrode tip dressing apparatus 1, the dressing head 11 is provided with a motor 12 for driving dressing tools. The dressing tool holder 3 is driven to rotate via a reduction mechanism by means of the motor 12; each of the dressing tools 2 is thus rotated. Moreover, the pair of the guide rails 10 is provided with compression springs 13. By shifting the dressing head 11 along the guide rails 10, each of the compression springs 13 is compressed and stretched, thereby enabling to absorb impact when the top electrode tip 5 abuts to each of the dressing tools 2. As shown in FIG. 3, the dressing tool holder 3 is formed into approximately cylindrical shape and is also provided with a conical hole 14 (see FIG. 1) with an identical shaft center relative to the dressing tool holder 3. Further, as shown in FIG. 1, pluralities of dressing tool-housings 15 (4 tool-housings in this embodiment), which house the dressing tools 2, are arranged evenly around the shaft center of the dressing tool holder 3.

Figure 4A:
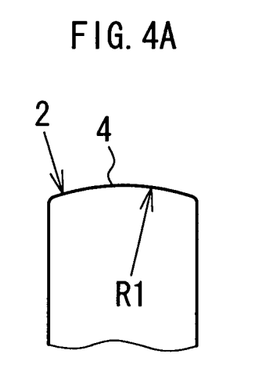
FIG. 4A is a magnified view of a section taken along the line A-A of FIG. 1.
Figure 4B:
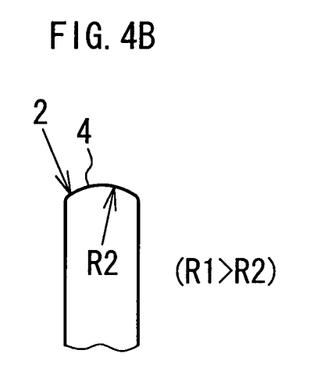
FIG. 4B is also a magnified view of a section taken along the line B-B of FIG. 1.

Still further, in the electrode tip dressing apparatus 1, the dressing tools 2 are made of rigid wear-resisting materials, and as shown in FIG. 1, by housing each of the dressing tools 2 within the respective dressing tool housing 15 of the dressing tool holder 3, the dressing portions 4 abutted to the top electrode tip 5 are radially arranged, extending from the center of the dressing tool holder 3 (rotation center of the dressing tools 2) to the outer side thereof. Moreover, as shown in FIG. 4, the dressing portions 4 of the dressing tools 2 are formed into a curved surface. By adjusting a curvature radius R1 and R2 (R1>R2) of the dressing portions 4, a contact width wherein the top electrode tip 5 abuts to the dressing portions 4 is adjusted from the center of the electrode tip 6 to the outer side thereof. Accordingly, the amount of the dressing work done by the dressing tool 2 is made to be constant on the whole area of the dressing portion 4.

Figure 5:
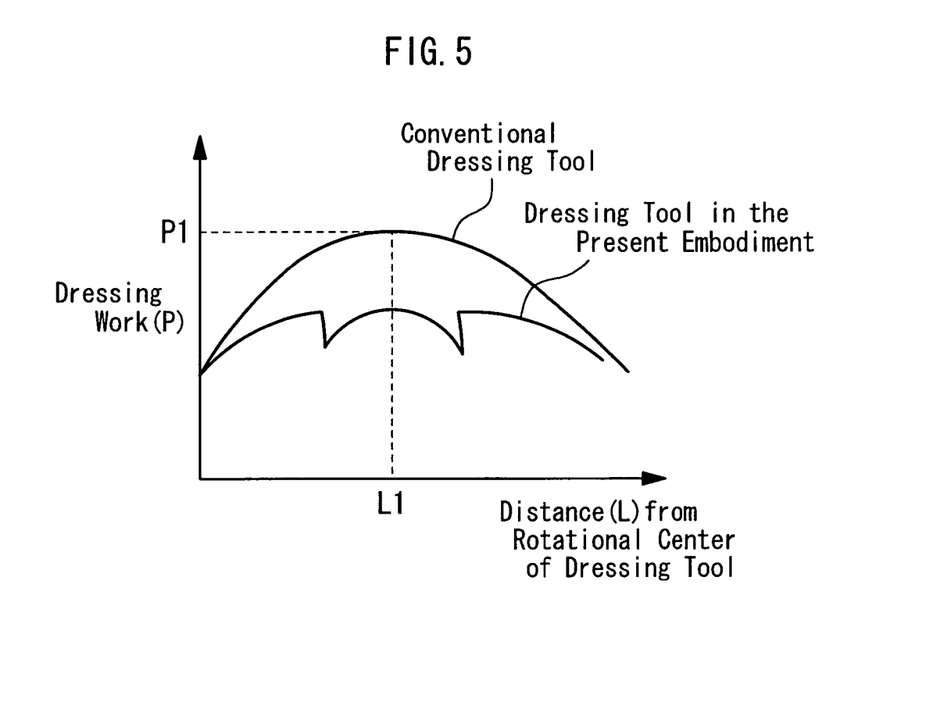
FIG. 5 is an explanatory view showing a relation between a distance from a rotational center of each of the dressing tools and an amount of dressing work based on the present invention and a conventional example.
Figure 10A:
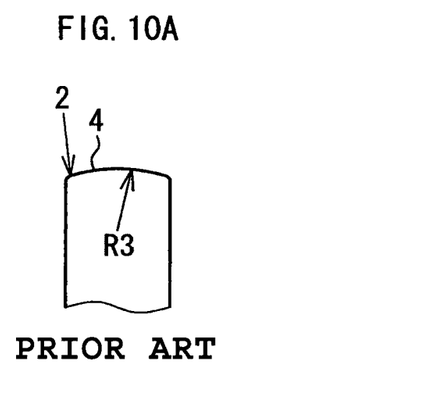
FIG. 10A is a magnified view of a section taken along the line C-C of FIG. 9.
Figure 10B:
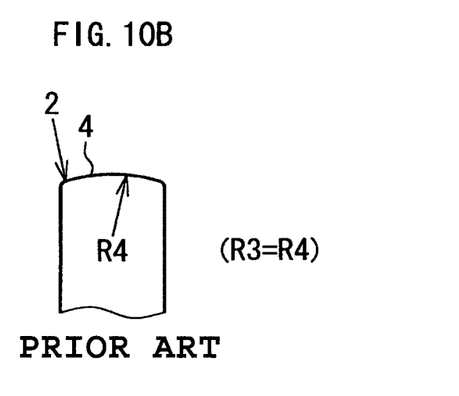
FIG. 10B is a magnified view of a section taken along the line D-D of FIG. 9.

Furthermore, as shown in FIG. 5, in conventional dressing tools 2 (see FIGS. 9 and 10) wherein a contact width of dressing portions 4 is constant from the center of an electrode tip 6 to the outer side thereof (also meaning that the curvature radius R of the dressing portions 4 is constant from the rotational center of the dressing tools 2 to the outer side thereof, a peak value P1, which shows an amount of dressing work in the dressing portions 4, is placed approximately at center from the rotational center of the dressing tools 2 to the outer side thereof. On the contrary, in the electrode tip dressing apparatus 1 of the present invention, around an L1, wherein the amount of the dressing work at the dressing portions 4 in the conventional electrode tip dressing apparatus 1 arrives at a peak value, a certain range of the curvature radius R2 is made smaller. As a result, by making the contact width between the curvature radius R2 and the top electrode tip 5 of each of the dressing portions 4 smaller, the amount of the dressing work done with the dressing tools 2 becomes constant at the whole area of the dressing portions 4 from the rotational center of the dressing tools 2 to the outer side thereof.

Next, some functional elements of the electrode tip dressing apparatus 1 of the present invention will be described. First, the top electrode tip 5, through applied pressure of spot welding (resistance welding), is pressed to each of the dressing tools 2 fitted into the dressing tool holder 3 of the dressing head 11. In this condition, each of the dressing tools 2 is made to rotate around the electrode tip 6, conducting a relative displacement between the top electrode tip 5 and the dressing portion 4 of each of the dressing tools 2. While conducting the relative displacement, friction energy (equal to an amount of the dressing work in which the dressing tool 2 conducts to the top electrode tip 5) occurs between the top electrode tip 5 and the dressing portion 4 of each of the dressing tools 2. With the friction energy, the top electrode tip 5 is plastically deformed into a given form. In the electrode tip dressing apparatus 1 of the present invention, by adjusting the curvature radius of the dressing portion 4 of each of the dressing tools 2, the contact width between the top electrode tip 5 and the dressing portion 4 of each of the dressing tools 2 is adjusted. Accordingly, as shown in FIG. 5, the amount of the dressing work done with each of the dressing tools 2 becomes constant at the whole area of the dressing portion 4, from the rotational center of the dressing tool 2 to the outer side thereof. An excess amount of the dressing work (amount of the dressing work in which the dressing tool 2 conducts to the top electrode tip 5) is reduced, and the top electrode tip 5 can be plastically deformed into a given form with the minimal amount of the dressing work.

With the above embodiment, the following effect can be obtained.

In the electrode tip dressing apparatus 1 of the present invention, the curvature radius of the dressing portion 4 of each of the dressing tools 2 is adjusted, whereby the contact width between the top electrode tip 5 and the dressing portion 4 of each of the dressing tools 2 is favorably adjusted, from the rotational center of the dressing tool 2 to the outer side thereof. The amount of the dressing work done with each of the dressing tools 2 becomes constant at the whole area of the dressing portion 4, from the rotational center of the dressing tool 2 to the outer side thereof.

Based on the above, in the electrode tip dressing apparatus 1 of the present invention, an excess amount of the dressing work, which brings decline of productivity, can be avoided, thus enabling to dress the top electrode tip 5 with the minimal amount of the dressing work. Further, it is possible to reduce a rotational driving power of the dressing tools 2, enabling to labor-save or miniaturize the motor 12 for driving dressing tools as well as the electrode tip dressing apparatus 1.

Here, the embodiment of the present invention is not limited to the embodiment hereinabove described, but the following may be applied.

Figure 6:
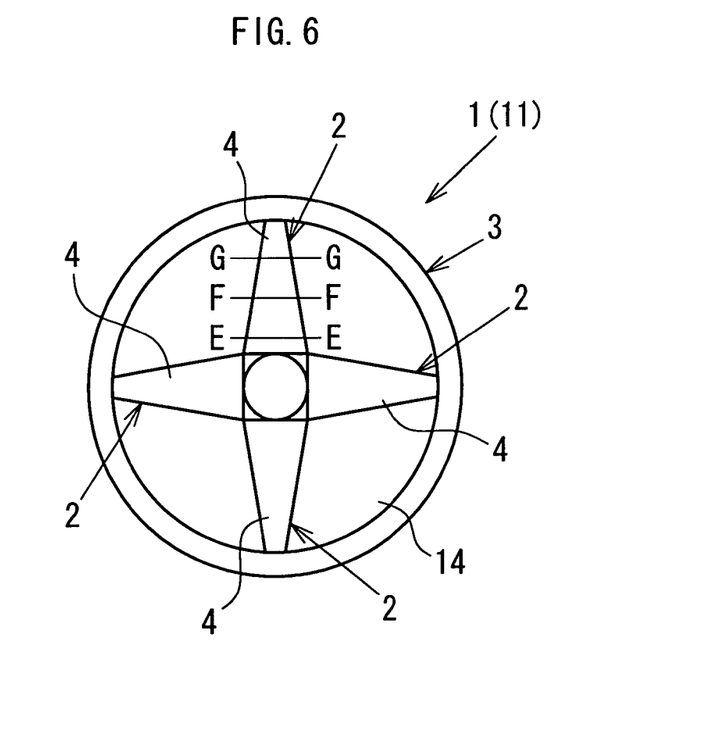
FIG. 6 is an explanatory view of the electrode tip dressing apparatus according to another embodiment of the present invention, which shows dressing tools arranged in a dressing head.

In the conventional electrode tip dressing apparatus 1 (see FIGS. 9 and 10), the amount of dressing work done with the dressing tool 2 is constantly increased from the rotational center of the dressing tool 2 to the outer side thereof. On the contrary, as shown in FIG. 6, the electrode tip dressing apparatus 1 may be constructed in such a manner that a curvature radius of each of dressing portions 4 is made to gradually decrease from the rotational center of dressing tools 2 to the outer side thereof (R5>R6>R7 in FIG. 7), and the dressing tools 2 are radially arranged.

Figure 7A:
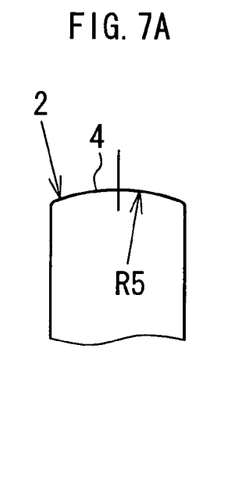
FIG. 7A is a magnified view of a section taken along the line E-E of FIG. 6.
Figure 7B:
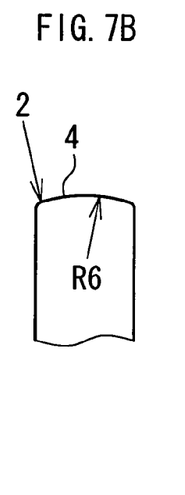
FIG. 7B is a magnified view of a section taken along the line F-F of FIG. 6.
Figure 7C:
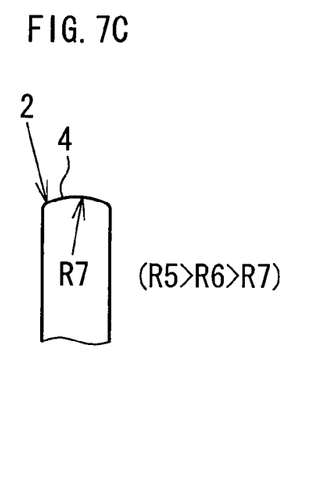
FIG. 7C is a magnified view of a section taken along the line G-G of FIG. 6.

In this case, while dressing, the amount of dressing work done with the dressing tools 2 becomes constant at the whole area of the dressing portion 4, from the rotational center of the dressing tools 2 to the outer side thereof. With this embodiment, compared to the conventional electrode tip dressing apparatus 1, an excess amount of the dressing work, which brings decline of productivity, can be avoided thereby enabling to dress the top electrode tip 5 with the minimal amount of the dressing work. It is also possible to reduce a rotational driving power of the dressing tools 2, enabling to labor-save or miniaturize a motor 12 for driving dressing tools as well as the electrode tip dressing apparatus 1.

Figure 8:
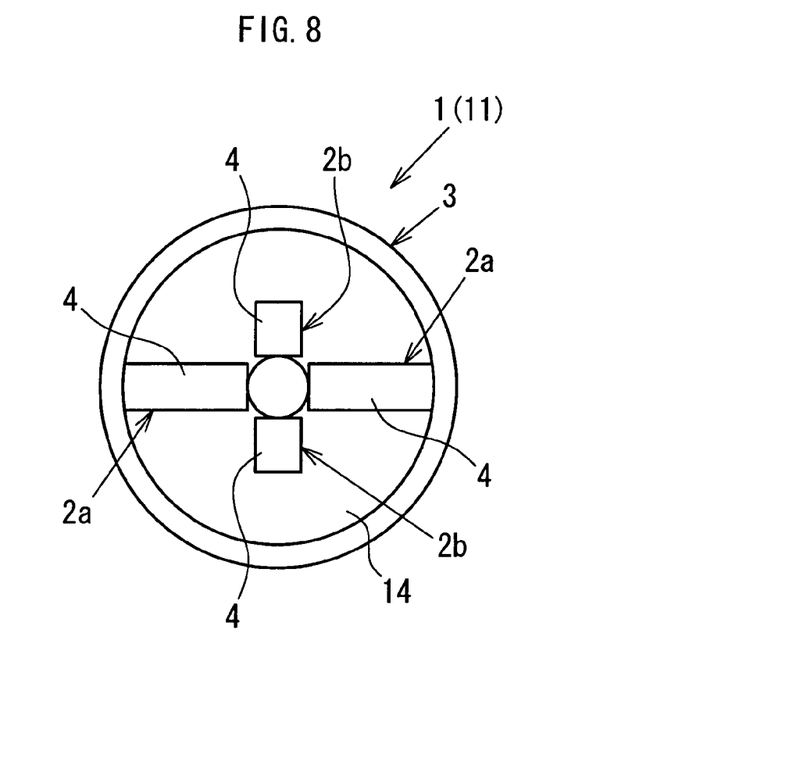
FIG. 8 is an explanatory view of the electrode tip dressing apparatus according to still another embodiment of the present invention, which shows dressing tools arranged in a dressing head.

The amount of the dressing work done with the dressing tools 2 in the conventional electrode tip dressing apparatus 1 (see FIGS. 9 and 10) is deviated toward the rotational center of the dressing work 2. In this case, as shown in FIG. 8, the electrode tip dressing apparatus 1 of the present invention may be configured with main dressing tools 2*a* by which a top electrode tip 5 is dressed from the center of an electrode tip 6 to the outside thereof; and adjusted dressing tools 2*b* placed to be deviated toward the rotational center of the dressing tools 2 so as to offset the amount of the deviated dressing work done with the main dressing tools 2*a*. The dressing tools 2 composed of the main dressing tools 2*a* and the adjusted dressings tools 2*b* are radially arranged.

In the above structure, the amount of the deviated dressing work done with dressing portions 4 of the main dressing tools 2*a* can be adjusted with the adjusted dressing tools 2*b*. While dressing, the amount of the dressing work done with the dressing tools 2 is made to be constant at the whole area of the dressing portions 4, from the rotational center of the dressing tools 2 to the outer side thereof. Accordingly, in comparison with the conventional electrode tip dressing apparatus 1, an excess amount of the dressing work, which brings decline of productivity, can be avoided thereby enabling to dress the top electrode tip 5 with the minimal amount of the dressing work.

It is also possible to reduce a rotational driving power of the dressing tools 2, enabling to labor-save or miniaturize a motor 12 for driving dressing tools as well as the electrode tip dressing apparatus 1.

The invention claimed is:

1. An electrode tip dressing apparatus, in which top of an electrode tip is pressed against pluralities of dressing tools radially arranged; the dressing tools are rotated around the electrode tip so as to conduct a relative displacement between the top of the electrode tip and a dressing portion of each of the dressing tools; and the top of the electrode tip is plastically deformed into a given form, wherein the dressing portion of each of the dressing tools has a surface that curves around a longitudinal axis of the dressing portion, the surface being defined by a plurality of curvature radii differing from one another along a length of the dressing portion, and wherein the dressing portion of each of the dressing tools is constructed so that an amount of dressing work, in which the dressing tools conduct to the top of the electrode tip, becomes constant from the rotational center of the dressing tools to the outer side of the dressing tools.

2. The electrode tip dressing apparatus according to claim 1, wherein each of the dressing tools with the dressing portion in an identical form is evenly arranged around the rotational center of the dressing tools; and a contact width in which the top of the electrode tip abuts to the dressing portion is adjusted so that an amount of dressing work, in which the dressing tools conduct to the top of the electrode tip, becomes constant at the whole area of the dressing portion, from the rotational center of the dressing tools to the outer side of the dressing tools.

3. The electrode tip dressing apparatus according to claim 1, wherein the electrode tip dressing apparatus includes: main dressing tools by which the top of the electrode tip is dressed from the center of the electrode tip to the outer side of the electrode tip; and adjusted dressing tools arranged so as to offset an amount of deviated dressing work done with the main dressing tools.

4. An electrode tip dressing tool, in which dressing tools are radially arranged in an electrode tip dressing apparatus, and are rotated around an electrode tip while the top of the electrode tip is pressed against a dressing portion of each of the dressing tools; and the top of the electrode tip and the dressing portion are relatively displaced so that the top of the electrode tip is plastically deformed into a given form, wherein the dressing portion of each of the dressing tools has a surface that curves around a longitudinal axis of the dressing portion, the surface being defined by a plurality of curvature radii differing from one another along a length of the dressing portion, and wherein a contact width, in which the top of the electrode tip abuts to the dressing portion, is adjusted so that an amount of dressing work conducted to the top of the electrode tip becomes constant at the whole area of the dressing portion, from the rotational center of the dressing tools to the outer side of the dressing tools.

* * * * *